(12) United States Patent
Sasagawa

(10) Patent No.: US 6,308,217 B1
(45) Date of Patent: *Oct. 23, 2001

(54) SIGNALLING DEVICE AND SIGNALLING METHOD

(75) Inventor: Yasushi Sasagawa, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,801

(22) Filed: Feb. 9, 1998

(30) Foreign Application Priority Data

Aug. 26, 1997 (JP) .................................................. 9-229868

(51) Int. Cl.[7] .......................... G06F 15/177; G06F 13/38

(52) U.S. Cl. .................... 709/236; 709/237; 709/246; 709/250

(58) Field of Search ................................... 709/227, 228, 709/237, 250, 236, 224, 226, 246; 379/88.22; 370/395

(56) References Cited

U.S. PATENT DOCUMENTS

| | | | | |
|---|---|---|---|---|
| 5,740,230 | * | 4/1998 | Vaudreuil | 379/88.22 |
| 5,862,329 | * | 1/1999 | Aras et al. | 709/204 |
| 5,867,653 | * | 2/1999 | Aras et al. | 709/204 |
| 5,920,562 | * | 7/1999 | Christie et al. | 370/395 |
| 5,940,393 | * | 8/1999 | Duree et al. | 370/392 |
| 5,943,337 | * | 9/1999 | Sasagawa | 370/395 |
| 5,974,237 | * | 10/1999 | Shurmer et al. | 709/224 |
| 6,058,422 | * | 5/2000 | Ayanoglu et al. | 709/226 |
| 6,219,348 | * | 4/2001 | Allen, Jr. et al. | 370/354 |

FOREIGN PATENT DOCUMENTS

| | | |
|---|---|---|
| 715461 | 1/1995 | (JP) . |
| 7-147580 * | 1/1995 | (JP) . |
| 7202906 | 8/1995 | (JP) . |

OTHER PUBLICATIONS

Armitage, G., "RFC 2022—Support for Multicast over UNI 3.0/3.1 based ATM Networks", Nov. 1996, www.faqs.org/rfcs2022.html, pp. 1–59.*

Armitage, G.J., "IP multicasting over ATM networks", Apr. 1997, IEEE Journal on Selected Areas in Communications, vol. 15 Issue 3, pp. 445–457.*

McCutcheon, Mark, "UNI 3.0 and UNI 3.1", Jul. 1997, www.cs.ub.ca/nest/dsg/tevia_files/techreport/node11.html, pp. 1.*

* cited by examiner

Primary Examiner—Mark H. Rinehart
Assistant Examiner—Almari Romero
(74) Attorney, Agent, or Firm—Helfgott & Karas, P.C.

(57) ABSTRACT

An ATM network accommodates terminals having the version UNI 3.0 of signalling software installed and terminals having the version UNI 3.1 of the signalling software installed. A signalling device, when receiving a signalling message directed from a version UNI 3.0 terminal to a version UNI 3.1 terminal, translates the message created by the version UNI 3.0 signalling software into a format that the version UNI 3.1 signalling software can process, then sends it the version UNI 3.1 terminal.

18 Claims, 42 Drawing Sheets

|  | TERMINAL A | TERMINAL B | TERMINAL C | TERMINAL D | TERMINAL E | TERMINAL F | TERMINAL G | TERMINAL H |
|---|---|---|---|---|---|---|---|---|
| TERMINAL A | ○ | ○ | × | × | × | × | × | × |
| TERMINAL B | ○ | ○ | × | × | × | × | × | × |
| TERMINAL C | × | × | ○ | ○ | × | × | ○ | ○ |
| TERMINAL D | × | × | ○ | ○ | × | × | ○ | ○ |
| TERMINAL E | × | × | × | × | ○ | ○ | × | × |
| TERMINAL F | × | × | × | × | ○ | ○ | × | × |
| TERMINAL G | × | × | ○ | ○ | × | × | ○ | ○ |
| TERMINAL H | × | × | ○ | ○ | × | × | ○ | ○ |

FIG. 2

| LINE | ATM ADDRESS | VERSION | TRANSLATION PATTERN |
|---|---|---|---|
| #1 | add1 | 3.0 | |
| #2 | add2 | 3.1 | |
| ⋮ | ⋮ | ⋮ | |
| #N | SWITCH 2-2 | 3.1 | |
| ⋮ | ⋮ | ⋮ | |

| ATM ADDRESS | LINE | TRANSLATION PATTERN |
|---|---|---|
| add21 | #11 | |
| add22 | #11 | |
| add23 | #13 | |
| ⋮ | ⋮ | |

| CALL REFERENCE | ORIGINATING ATM ADDRESS | TERMINATING ATM ADDRESS |
|---|---|---|
| C R 1 | a d d  S 1 | a d d  R 1 |
| C R 2 | a d d  S 2 | a d d  R 2 |
| ⋮ | ⋮ | ⋮ |

| SYSTEM FLAG | 0 |
|---|---|
| LINE FLAG | 1 |
| ATM ADDRESS FLAG | 0 |

TRANSLATION PATTERN DATA

SETUP

| Significance: global | | | |
|---|---|---|---|
| Direction : both | | | |

| Information element | Direction | Type | Length |
|---|---|---|---|
| Protocol discriminator | both | M | 1 |
| Call reference | both | M | 4 |
| Message type | both | M | 2 |
| Message length | both | M | 2 |
| AAL parameters | both | O | 4-20 |
| ATM user cell rate | both | M | 12-30 |
| Broadband bearer capability | both | M | 6-7 |
| Broadband high layer information | both | O | 4-13 |
| Broadband repeat indicator | both | O | 4-5 |
| Broadband low layer information | both | O | 4-17 |
| Called party number | both | M | 4-25 |
| Called party subaddress | both | O | 4-25 |
| Calling party number | both | O | 4-26 |
| Calling party subaddress | both | O | 4-25 |
| Connection identifier | N->U | M | 9 |
| QoS parameter | both | M | 6 |
| Broadband sending complete | both | O | 4-5 |
| Transit network selection | U->N | O | 4-8 |

FIG. 10A

CONNECT

| Significance: global | | | |
|---|---|---|---|
| Direction : both | | | |

| Information element | Direction | Type | Length |
|---|---|---|---|
| Protocol discriminator | both | M | 1 |
| Call reference | both | M | 4 |
| Message type | both | M | 2 |
| Message length | both | M | 2 |
| AAL parameters | both | O | 4-11 |
| Broadband low layer information | both | O | 4-17 |
| Connection identifier | both | O | 4-9 |

FIG. 10B

| No. | ITEM | VERSION 3.0 | VERSION 3.1 |
|---|---|---|---|
| 1 | EXTEND IE ACTION INDICATOR IN GENERAL INFORMATION ELEMENT | BITS 1,2 IN OCTET2 ARE USED BITS 3 IS SPARE | EXTEND BITS 1,2,3 IN OCTET2 |
| 2 | CHANGE MEANING OF AAL PARAMETERS FOR AAL TYPE1 OCTET11 | OCTET 11 STRUCTURED DATA TRANSFER IDENTIFIER OCTET 11.1 STRUCTURED DATA TRANSFER | OCTET 11 STRUCTURED DATA TRANSFER BLOCKSIZE IDETIFIER OCTET11.1, 11.2 STRUCTURED DATA TRANSFER BLOCKSIZE |
| 3 | DELETE MOD FROM AAL PARAMETERS FOR AAL TYPE 3/4 | DEFINE MOD | DELETE MOD |

FIG. 11

| | | DEFINE MOD | | DELETE MOD | |
|---|---|---|---|---|---|
| 4 | DELETE MOD IN AAL PARAMETERS FOR AAL TYPE5 | | | | |
| 5 | ADD CONTENTS OF CBR RATE IN AAL PARAMETERS FOR AAL TYPE1 | "01000001" | UNDEFINED | ADD "01000001" | n x 8kbit/s |
| 6 | ADD CONTENTS OF ERROR CORRECTION METHOD FOR AAL PARAMETERS FOR AAL TYPE1 | "00000010" | UNDEFINED | ADD "00000010" | FORWARD ERROR CORRECTION BASED ON DELAY SENSITIVE SIGNAL TRANSFER |

F I G. 1 2

| | | | HIGH LAYER PROFILE | | |
|---|---|---|---|---|---|
| 7 | DELETE CONTENTS OF HLI TYPE IN B-HL | "0000010" — HIGH LAYER PROFILE | | "0000010" — DELETE | |
| 8 | ADD CONTENTS OF TYPE OF SUB-ADDRESS IN CALLING PARTY SUB-ADDRESS/CALLED PARTY SUB-ADDRESS | "001" — UNDEFINED | | ADD "001" — ATM ENDSYSTEM ADDRESS | |
| 9 | CHANGE CONTENTS OF CAUSE VALUE | "0001010" — VPCI/VCI UNACCEPTABLE | | "0001010" — DELETE | |
| | | "0010000" — UNDEFINED | | "0010000" — NORMAL CALL CLEARING | |
| | | "0100100" — UNDEFINED | | "0100100" — VPCI/VCI ASSIGNMENT FAILURE | |
| | | "0100101" — UNDEFINED | | "0100101" — USER CELL RATE NOT AVAILABLE | |
| | | "0110011" — USER CELL RATE NOT AVAILABLE | | "0110011" — DELETE | |
| | | "1001110" — UNDEFINED | | "1001110" — AAL PARAMETERS CANNOT BE SUPPORTED | |
| | | "1011101" — AAL PARAMETERS CANNOT BE SUPPORTED | | "1011101" — DELETE | |

FIG. 13

| No. | ITEM | VERSION 3.0 | VERSION 3.1 |
|---|---|---|---|
| 10 | ADD CONTENTS OF CODING STANDARD FOR QOS PARAMETERS | "00" —— UNDEFINED | "00" —— ITU-T STANDARDIZED |
| 11 | ADD CONTENTS AND CHANGE METHOD OF USING QOS CLASS FORWARD FOR QOS PARAMETERS | "1111111" —— UNDEFINED | "1111111" —— RESERVE BY ITU-T |
| 12 | CHANGE METHOD OF USING QOS CLASS FORWARD/BACKWARD OF QOS PARAMETERS | SPECIFY QOS CLASS 0~4 WITH CODING STANDARD "11" | SPECIFY QOS CLASS 1~4 WITH CODING STANDARD "11". SPECIFY QOS CLASS 0 WITH CODING STANDARD "00" |

F I G. 1 4

GENERAL INFORMATION ELEMENT
[V3.1]

| bits | | | | | | | | |
|---|---|---|---|---|---|---|---|---|
| 8 | 7 | 6 | 5 | 4 | 3 | 2 | 1 | |
| \multicolumn{8}{|c|}{Information element identifier} | 1 |
| 1 ext | Coding Standard | | Flag | Res. | IE Instruction Field | | IE Action Indicator | 2 |
| \multicolumn{8}{|c|}{Length of Information Elements} | 3 – 4 |
| \multicolumn{8}{|c|}{Contents of Information Elements} | 5 etc. |

IE Action Indicator

| Bits 321 | Meaning |
|---|---|
| 000 | Clear call |
| 001 | Discard Information Element, and proceed |
| 010 | Discard Information Element, proceed, and report status |
| 101 | Discard message and ignore |
| 110 | Discard message and report status |
| All others | Reserved |

FIG. 15

GENERAL INFORMATION ELEMENT
[V3.0]

| bits | | | | | | | | |
|---|---|---|---|---|---|---|---|---|
| 8 | 7 | 6 | 5 | 4 | 3 | 2 | 1 | |
| Information element identifier | | | | | | | | 1 |
| 1 ext | Coding Standard | Flag | Res. | Spare | Action Indicator | | | 2 |
| | | | | | | | | |
| | | | IE Instruction Field | | | | | |
| Length of Information Elements | | | | | | | | 3 – 4 |
| Contents of Information Elements | | | | | | | | 5 etc. |

Action Indicator

| Bits 21 | Meaning |
|---|---|
| 00 | Clear call |
| 01 | Discard and proceed |
| 10 | Discard, proceed, and report status |
| 11 | Reserved |

FIG. 16

ATM ADAPTATION LAYER PRAMETERS (TYPE 1)
[V3.1]

| bits 8 7 6 5 4 3 2 1 | |
|---|---|
| OMITTED | 1 – 5 |
| 1 0 0 0 0 Subtype Identifier 0 1 1 | 6 |
| Subtype | 6.1 |
| 1 0 0 0 0 CBR Rate Identifier 0 1 0 | 7 |
| CBR Rate | 7.1 |
| 1 0 0 0 0 Multiplier Identifier 0 1 1 | 8 |
| Multiplier | 8.1 – 8.2 |
| 1 0 0 0 Source Clock Frequency Recovery Method Identifier 1 0 0 | 9 |
| Source Clock Frequency Recovery Method | 9.1 |
| 1 0 0 0 Error Correction Method Identifier 1 0 1 | 10 |
| Error Correction Method | 10.1 |
| 1 0 0 0 Structured Data Transfer Blocksize Identifier 1 1 0 | 11 |
| Structured Data Transfer Blocksize | 11.1 – 11.2 |
| 1 0 0 0 Partially Filled Cells Identifier 1 1 1 | 12 |
| Partially Filled Cells Method | 12.1 |

(AAL TYPE 1)

FIG. 17

CBR rate

| Bits 8765 4321 | Meaning |
| --- | --- |
| 0000 0001 | 64 kbit/s |
| 0000 0100 | 1544 kbit/s (DS1) |
| —OMITTED— | |
| 0100 0000 | n x 64 kbit/s |
| 0100 0001 | n x 8 kbit/s |

Structured Data Transfer Blocksize 16-bit integer representation of values between 1 and 65,535, i.e., $2^{16}-1$. This parameter represents the blocksize of SDT CBR service.

Error Correction Method

| Bits 8765 4321 | Meaning |
| --- | --- |
| 0000 0000 | Null (no error correction is provided) |
| 0000 0001 | Aforward error correction method for loss sensitive signal transport (cf. I.361) |
| 0000 0010 | Aforward error correction method for delay sensitive signal |

FIG. 18

ATM ADAPTATION LAYER PRAMETERS (TYPE 1)
[V3.0]

| 8 | 7 | 6 | bits 5 | 4 | 3 | 2 | 1 | |
|---|---|---|---|---|---|---|---|---|
| | | | OMITTED | | | | | 1 – 5 |
| 1 | 0 | 0 | 0 | 0 | 1 | 0 | 1 | 6 |
| | | | Subtype Identifier | | | | | 6.1 |
| | | | Subtype | | | | | 7 |
| 1 | 0 | 0 | 0 | 0 | 1 | 1 | 0 | 7.1 |
| | | | CBR Rate Identifier | | | | | 8 |
| | | | CBR Rate | | | | | 8.1 – 8.2 |
| 1 | 0 | 0 | 0 | 0 | 1 | 1 | 1 | 9 |
| | | | Multiplier Identifier | | | | | 9.1 |
| | | | Multiplier | | | | | 10 |
| 1 | 0 | 0 | 0 | 1 | 0 | 0 | 0 | 10.1 |
| | | | Clock Recovery Type Identifier | | | | | 11 |
| | | | Clock Recovery Type | | | | | 11.1 |
| 1 | 0 | 0 | 0 | 1 | 0 | 0 | 1 | 12 |
| | | | Error Correction Identifier | | | | | 12.1 |
| | | | Error Correction | | | | | |
| 1 | 0 | 0 | 0 | 1 | 0 | 1 | 0 | |
| | | | Structured Data Transfer Identifier | | | | | |
| | | | Structured Data Transfer | | | | | |
| 1 | 0 | 0 | 0 | 1 | 0 | 1 | 1 | |
| | | | Partially Filled Cells Identifier | | | | | |
| | | | Partially Filled Cells | | | | | |

(AAL TYPE 1)

FIG. 19

CBR rate

| Bits<br>8765 4321 | Meaning |
|---|---|
| 0000 0001 | 64 kbit/s |
| 0000 0100 | 1544 kbit/s (DS1) |
| OMITTED | |
| 0100 0000 | n x 64 kbit/s |
| 0100 0001 | UNDEFINED |

Structured Data Transfer

| Bits<br>8765 4321 | Meaning |
|---|---|
| 0000 0000 | Null |
| 0000 0001 | Structured Data Transfer (SDT) |

Error Correction Type

| Bits<br>8765 4321 | Meaning |
|---|---|
| 0000 0000 | Null |
| 0000 0001 | Interleaving FEC |

FIG. 20

ATM ADAPTATION LAYER PARAMETERS (TYPE 3/4)
[V3.1]

| 8 | 7 | 6 | 5 | 4 | 3 | 2 | 1 | |
|---|---|---|---|---|---|---|---|---|
| | | | OMITTED | | | | | 1 – 5 |
| 1 | | | Forward Maximum CPCS-SDU Size Identifier | | | | | 6 |
| | | | | 0 | 1 | 0 | 0 | |
| | | | Forward Maximum CPCS-SDU Size | | | | | 6.1 – 6.2 |
| 1 | | | Backward Maximum CPCS-SDU Size Identifier | | | | | 7 |
| | | | | 0 | 0 | 0 | 1 | |
| | | | Backward Maximum CPCS-SDU Size | | | | | 7.1 – 7.2 |
| 1 | | | MID Range Identifier | | | | | 8 |
| | | | | 0 | 0 | 1 | 0 | |
| | | | MID Range | | | | | 8.1 – 8.4 |
| 1 | | | SSCS Type Identifier | | | | | 9 |
| | | | | 0 | 1 | 0 | 0 | |
| | | | SSCS Type | | | | | 9.1 |

(AAL TYPE 3/4)

FIG. 21

ATM ADAPTATION LAYER PARAMETERS (TYPE 3/4)
[V3.0]

| 8 | 7 | 6 | bits 5 | 4 | 3 | 2 | 1 | |
|---|---|---|---|---|---|---|---|---|
| | | | OMITTED | | | | | 1 - 5 |
| 1 | Forward Maximum CPCS-SDU Size Identifier | | | | 0 | 0 | 0 | 6 |
| | Forward Maximum CPCS-SDU Size | | | | | | | 6.1 - 6.2 |
| 1 | Backward Maximum CPCS-SDU Size Identifier | | | | 0 | 0 | 1 | 7 |
| | Backward Maximum CPCS-SDU Size | | | | | | | 7.1 - 7.2 |
| 1 | MID Range Identifier | | | | 0 | 1 | 0 | 8 |
| | MID Range | | | | | | | 8.1 - 8.4 |
| 1 | Mode Identifier | | | | 0 | 1 | 1 | 9 |
| | Mode | | | | | | | 9.1 |
| 1 | SSCS Type Identifier | | | | 1 | 0 | 0 | 10 |
| | SSCS Type | | | | | | | 10.1 |

(AAL TYPE 3/4)

Mode

| Bits 8765 4321 | Meaning |
|---|---|
| 0000 0001 | Message mode |
| 0000 0010 | Streaming mode |

FIG. 22

ATM ADAPTATION LAYER PARAMETERS (TYPE 5)

[V3.1]

| 8 | 7 | 6 | bits 5 | 4 | 3 | 2 | 1 | |
|---|---|---|---|---|---|---|---|---|
| | | | OMITTED | | | | | 1 – 5 |
| 1 | 0 | 0 | 0 | 1 | 1 | 0 | 0 | 6 |
| Forward Maximum CPCS-SDU Size Identifier | | | | | | | | 6.1 – 6.2 |
| Forward Maximum CPCS-SDU Size | | | | | | | | |
| 1 | 0 | 0 | 0 | 0 | 0 | 0 | 1 | 7 |
| Backward Maximum CPCS-SDU Size Identifier | | | | | | | | 7.1 – 7.2 |
| Backward Maximum CPCS-SDU Size | | | | | | | | |
| 1 | 0 | 0 | 0 | 0 | 1 | 0 | 0 | 8 |
| SSCS Type Identifier | | | | | | | | |
| SSCS Type | | | | | | | | 8.1 |

(AAL TYPE 5)

FIG. 23

ATM ADAPTATION LAYER PARAMETERS (TYPE 5)
[V3.0]

| 8 | 7 | 6 | 5 | 4 | 3 | 2 | 1 | |
|---|---|---|---|---|---|---|---|---|
| | | | OMITTED | | | | | 1 – 5 |
| 1 | Forward Maximum CPCS-SDU Size Identifier 0 0 0 1 1 0 | | | | | | | 6 |
| | Forward Maximum CPCS-SDU Size | | | | | | | 6.1 – 6.2 |
| 1 | Backward Maximum CPCS-SDU Size Identifier 0 0 0 0 0 1 | | | | | | | 7 |
| | Backward Maximum CPCS-SDU Size | | | | | | | 7.1 – 7.2 |
| 1 | Mode Identifier 0 0 0 0 0 1 1 | | | | | | | 8 |
| | Mode | | | | | | | 8.1 |
| 1 | SSCS Type Identifier 0 0 0 0 0 1 0 | | | | | | | 9 |
| | SSCS Type | | | | | | | 9.1 |

(AAL TYPE 5)

Mode

| Bits 8765 4321 | Meaning |
|---|---|
| 0000 0001 | Message mode |
| 0000 0010 | Streaming mode |

FIG. 24

BROADBAND HIGH LAYER INFORMATION
[V3.1]

| 8 | 7 | 6 | 5 | 4 | 3 | 2 | 1 | bits |
|---|---|---|---|---|---|---|---|---|
| 0 | Broadband High Layer Information | | | | | | | 1 |
| | 0 | 1 | 1 | 1 | 1 | 0 | 1 | |
| | Information element identifier | | | | | | | |
| 1 ext | Coding Standard | | IE Instruction Field | | | | | 2 |
| Length of called party number contents | | | | | | | | 3–4 |
| 1 ext | High Layer Information Type | | | | | | | 5 |
| High Layer Information | | | | | | | | 6–13 |

High Layer Information Type

| Bits 765 4321 | Meaning |
|---|---|
| 000 0000 | ISO |
| 000 0001 | User Specific |
| 000 0010 | UNDEFINED |
| 000 0011 | Vendor-Specific Aplication Identifier |

FIG. 25

BROADBAND HIGH LAYER INFORMATION
[V3.0]

| bits 8 | 7 | 6 | 5 | 4 | 3 | 2 | 1 | |
|---|---|---|---|---|---|---|---|---|
| 0 | 1 | 0 | 1 | 1 | 1 | 0 | 1 | 1 |
| Broadband High Layer Information Information element identifier ||||||||  |
| 1 ext | Coding Standard | | IE Instruction Field ||||| 2 |
| Length of called party number contents |||||||| 3–4 |
| 1 ext | High Layer Information Type ||||||| 5 |
| High Layer Information |||||||| 6–13 |

High Layer Information Type

| Bits<br>765 4321 | Meaning |
|---|---|
| 000 0000 | ISO |
| 000 0001 | User Specific |
| 000 0010 | High layer profile |
| 000 0011 | Vendor-Specific Aplication Identifier |

FIG. 26

CALLED PARTY SUBADDRESS OR CALLING PARTY SUBADDRESS
[3.1]

| 8 | 7 | 6 | 5 | 4 | 3 | 2 | 1 | |
|---|---|---|---|---|---|---|---|---|
| \multicolumn{8}{|c|}{Called(Calling)party subaddress} | |
| 0 | 1 | 1 | 1 | 0 | 0 | 0 | 1 | 1 |
| (0 | 1 | 1 | 0 | 1 | 1 | 0 | 1) | |
| \multicolumn{8}{|c|}{Information element identifier} | |
| 1 ext | Coding Standard | | | IE Instruction Field | | | | 2 |
| \multicolumn{8}{|c|}{Length of called(Calling)party subaddress contents} | 3 — 4 |
| 1 ext | Type of subaddress | | | odd/even indicator | 0 Spare | 0 | 0 | 5 |
| \multicolumn{8}{|c|}{Subaddress information} | 6 |

Type of subaddress

| Bits 765 | Meaning |
|---|---|
| 000 | NSAP |
| 001 | ATM Endsystem Adress |

FIG. 27

CALLED PARTY SUBADDRESS OR CALLING PARTY SUBADDRESS
[3.0]

| 8 | 7 | 6 | 5 | 4 | 3 | 2 | 1 | |
|---|---|---|---|---|---|---|---|---|
| | | | bits | | | | | |
| | Called(Calling)party subaddress | | | | | | | |
| 0<br>(0 | 1<br>1 | 1<br>1 | 1<br>0 | 0<br>1 | 0<br>1 | 0<br>0 | 1<br>1) | 1 |
| | Information element identifier | | | | | | | |
| 1<br>ext | Coding<br>Standard | | | IE Instruction Field | | | | 2 |
| Length of called(Calling)party subaddress contents | | | | | | | | 3<br>–<br>4 |
| 1<br>ext | Type of subaddress | | | odd/even<br>indicator | 0 | 0<br>Spare | 0 | 5 |
| Subaddress information | | | | | | | | 6 |

Type of subaddress

| Bits<br>765 | Meaning |
|---|---|
| 000 | NSAP |
| 001 | UNDEFINED |

FIG. 28 cause

[3.1]

| bits | | | | | | | | |
|---|---|---|---|---|---|---|---|---|
| 8 | 7 | 6 | 5 | 4 | 3 | 2 | 1 | |
| Cause Information element identifier ||||||||  |
| 0 | 0 | 0 | 0 | 1 | 0 | 0 | 0 | 1 |
| 1 ext | Coding Standard || IE Instruction Field |||| | 2 |
| Length of cause information contents |||||||| 3 – 4 |
| 1 ext | 0 | 0 Spare | 0 | Location |||| 5 |
| 1 ext | Cause value ||||||| 6 |
| Diagnostics (if any) |||||||| 7 |

Cause value

| Bits 765 4321 | Number | Meaning |
|---|---|---|
| . . . | . . . | . . . |
| 000 1010 | 10 | UNDEFINED (DELETE) |
| 001 0000 | 16 | normal call clearing |
| . . | . . | . . |
| 010 0100 | 36 | VPI/VCI assignment failure |
| 010 0101 | 37 | user cell rate not available |
| . . | . . | . . |
| 011 0011 | 51 | UNDEFINED (DELETE) |
| . . | . . | . . |
| 100 1110 | 78 | AAL parameters cannot be supported |
| . . | . . | . . |
| 101 1101 | 93 | UNDEFINED (DELETE) |
| . . . | . . . | . . . |

FIG. 29

CAUSE
[3.0]

| bits 8 | 7 | 6 | 5 | 4 | 3 | 2 | 1 | |
|---|---|---|---|---|---|---|---|---|
| Cause Information element identifier | | | | | | | | 1 |
| 0 | 0 | 0 | 0 | 1 | 0 | 0 | 0 | |
| 1 ext | Coding Standard | | IE Instruction Field | | | | | 2 |
| Length of cause information contents | | | | | | | | 3 – 4 |
| 1 ext | 0 | 0 Spare | 0 | Location | | | | 5 |
| 1 ext | Cause value | | | | | | | 6 |
| Diagnostics (if any) | | | | | | | | 7 |

Cause value

| Bits 765 4321 | Number | Meaning |
|---|---|---|
| . . . | . . . | . . . |
| 000 1010 | 10 | VPI/VCI unacceptable |
| 001 0000 | 16 | UNDEFINED (DELETE) |
| . . | . . | . . |
| 010 0100 | 36 | UNDEFINED |
| 010 0101 | 37 | UNDEFINED |
| . . | . . | . . |
| 011 0011 | 51 | user cell rate not available |
| . . | . . | . . |
| 100 1110 | 78 | UNDEFINED |
| . . | . . | . . |
| 101 1101 | 93 | AAL parameters cannot be supported |
| . . . | . . . | . . . |

FIG. 30

QUALITY OF SERVICE PARAMETER
[3.1]

| 8 | 7 | 6 | 5 | 4 | 3 | 2 | 1 | |
|---|---|---|---|---|---|---|---|---|
| | | | | bits | | | | |
| 0 | 1 | 0 | 1 | 1 | 1 | 0 | 0 | 1 |
| Quality of service parameter Information element identifier | | | | | | | | |
| 1 ext | Coding Standard | | IE Instruction Field | | | | | 2 |
| Length of quality of service parameter contents | | | | | | | | 3 – 4 |
| QoS Class Forward | | | | | | | | 5 |
| QoS Class Backward | | | | | | | | 6 |

FIG. 31

Coding Standard

| Bits 76 | Meaning |
|---|---|
| 00 | ITU-T standardized |
| 11 | Standard defined for the network ( either public or private ) present on the network side of the interface |

QoS Class Forward(Backward)

| Bits 8765 4321 | Meaning |
|---|---|
| 0000 0000 | QoS class 0 -Unspecified QoS class |
| 0000 0001 | QoS class 1 |
| 0000 0010 | QoS class 2 |
| 0000 0011 | QoS class 3 |
| 0000 0100 | QoS class 4 |
| 1111 1111 | Reserved by ITU-T for future indication of parameterized QoS |

FIG. 32

QUALITY OF SERVICE PARAMETER
[3.0]

| bits 8 | 7 | 6 | 5 | 4 | 3 | 2 | 1 | |
|---|---|---|---|---|---|---|---|---|
| 0 | 1 | 0 | Quality of service parameter Information element identifier | | 1 | 1 | 0 | 0 | 1 |
| 1 ext | Coding Standard | | IE Instruction Field | | | | | 2 |
| Length of quality of service parameter contents | | | | | | | | 3 – 4 |
| QoS Class Forward | | | | | | | | 5 |
| QoS Class Backward | | | | | | | | 6 |

FIG. 33

Coding Standard

| Bits 76 | Meaning |
|---|---|
| 11 | Standard defined for the network ( either public or private ) present on the network side of the interface |

QoS Class Forward(Backward)

| Bits 8765 4321 | Meaning |
|---|---|
| 0000 0000 | QoS class 0 -Unspecified QoS class |
| 0000 0001 | QoS class 1 |
| 0000 0010 | QoS class 2 |
| 0000 0011 | QoS class 3 |
| 0000 0100 | QoS class 4 |
| 1111 1111 | UNDEFINED |

FIG. 34

| No. | ITEM | MANAGEMENT VERSION 3.0 TO 3.1 | MANAGEMENT VERSION 3.1 TO 3.0 |
|---|---|---|---|
| 1 | EXTEND IE ACTION INDICATOR IN GENERAL INFORMATION ELEMENT | — | — |
| 2 | CHANGE MEANING OF AAL PARAMETERS FOR AAL TYPE1 OCTET 11 | AUTOMATICALLY DELETE AAL PARAMETERS | AUTOMATICALLY DELETE AAL PARAMETERS |
|   |   | AUTOMATICALLY DELETE STRUCTURED DATA TRANSFER IDENTIFIER/STRUCTURED DATA TRANSFER | AUTOMATICALLY DELETE STRUCTURED DATA TRANSFER BLOCKSIZE IDENTIFIER/STRUCTURED DATA TRANSFER BLOCKSIZE |
| 3 | DELETE MOD FROM AAL PARAMETERS FOR AAL TYPE 3/4 | AUTOMATICALLY DELETE AAL PARAMETERS | — |
|   |   | AUTOMATICALLY DELETE MOD-ID/MOD |   |
| 4 | DELETE MOD IN AAL PARAMETERS FOR AAL TYPE 5 | AUTOMATICALLY DELETE AAL PARAMETERS | — |
|   |   | AUTOMATICALLY DELETE MOD-ID/MOD |   |
| 5 | ADD CONTENTS OF CBR RATE IN AAL PARAMETERS FOR AAL TYPE1 | — | AUTOMATICALLY DELETE AAL PARAMETERS |

F I G. 3 5

| No. | ITEM | MANAGEMENT VERSION 3.0 TO 3.1 | MANAGEMENT VERSION 3.1 TO 3.0 |
|---|---|---|---|
| 6 | ADD CONTENTS OF ERROR CORRECTION METHOD FOR AAL PARAMETERS FOR AAL TYPE1 | — | AUTOMATICALLY DELETE AAL PARAMETERS |
| | | | AUTOMATICALLY DELETE ERROR COLLECTION METHOD |
| 7 | DELETE CONTENTS OF HLI TYPE FOR B-HLI | AUTOMATICALLY DELETE B-HLI | — |
| 8 | ADD CONTENTS OF TYPE OF SUB-ADDRESS FOR CALLING PARTY SUB-ADDRESS/CALLED PARYT SUB-ADDRESS | — | AUTOMATICALLY DELETE CALLING PARTY SUBADDRESS/CALLED PARTY SUBADDRESS |
| 9 | CHANGE CONTENTS OF CAUSE VALUE FOR CAUSE | — | — |
| 10 | ADD CONTENTS OF CODING STANDARD FOR QOS PARAMETERS | — | — |
| 11 | ADD CONTENTS AND CHANGE METHOD OF USING QOS CLASS FORWARD/BACKWARD FOR QOS PARAMETERS | — | — |
| 12 | CHANGE METHOD OF USING QOS CLASS FORWARD/BACKWARD FOR QOS PARAMETERS | — | — |

FIG. 36

| No. | ITEM | MANAGEMENT VERSION 3.0 TO 3.1 | MANAGEMENT VERSION 3.1 TO 3.0 |
|---|---|---|---|
| 1 | EXTEND IE ACTION INDICATOR IN GENERAL INFORMATION ELEMENT |  | SET BIT 3 IN OCTET 2 TO 0 |
| 2 | CHANGE MEANING OF AAL PARAMETERS FOR AAL TYPE 1 OCTET 11 | SET STRUCTURED DATA TRANSFER BLOCKSIZE TO 192 (1.5M) | SET STRUCTURED DATA TRANSFER TO "00000001" —— SDT |
| 3 | DELETE MOD FROM AAL PARAMETERS AAL TYPE 3/4 | —— | SET "00000001" —— MESSAGE MODE |
| 4 | DELETE MOD FROM AAL PARAMETERS FOR AAL TYPE 5 | —— | SET "00000001" —— MESSAGE MODE |
| 5 | ADD CONTENTS OF CBR RATE IN AAL PARAMETERS FOR AAL TYPE 1 | —— | SET "00000001" —— 64KBIT/S |
| 6 | ADD CONTENTS OF ERROR CORRECTION METHOD FOR AAL PARAMETERS FOR AAL TYPE 1 |  | SET "00000000" —— NULL |

F I G. 3 7

| No. | ITEM | MANAGEMENT VERSION 3.0 TO 3.1 | MANAGEMENT VERSION 3.1 TO 3.0 |
|---|---|---|---|
| 7 | DELETE CONTENTS OF HLI TYPE FOR TYPE FOR B-HLI | SET "00000001" —— USER SPECIFIC | —— |
| 8 | ADD CONTENTS OF TYPE OF SUB-ADDRESS FOR CALLING PARTY SUB-ADDRESS/CALLED PARTY SUB-ADDRESS | SET "001" —— ATM ENDSYSTEM ADDRESS | SET "000" —— NSAP |
| 9 | CHANGE CONTENTS OF CAUSE VALUE FOR CAUSE | SET "0001010" ⇧ "0100100" "0110011" ⇧ "0100101" "1011101" ⇧ "1001110" | SET "0001010" ⇩ "0100100" "0110011" ⇩ "0100101" "1011101" ⇩ "1001110" "0011111" ⇩ "0010000" |
| 10 | ADD CONTENTS OF CODING STANDARD FOR QOS PARAMETERS | SET CODING STANDARD "00" AT QOS CLASS 0 | SET CODING STANDARD "11" |
| 11 | ADD CONTENTS AND CHANGE METHOD OF USING QOS CLASS FORWARD/BACKWARD FOR QOS PARAMETERS | —— | —— |
| 12 | CHANGE METHOD OF USING QOS CLASS FORWARD/BACKWARD FOR QOS PARAMETERS | —— | —— |

FIG. 38

| No. | ITEM | MANAGEMENT VERSION 3.0 TO 3.1 | MANAGEMENT VERSION 3.1 TO 3.0 |
|---|---|---|---|
| 1 | EXTEND IE ACTION INDICATOR IN GENERAL INFORMATION ELEMENT | REGISTER TRANSLATION PATTERN | REGISTER TRANSLATION PATTERN |
| 2 | CHANGE MEANING OF AAL PARAMETERS FOR AAL TYPE 1 OCTET 11 | REGISTER TRANSLATION PATTERN | REGISTER TRANSLATION PATTERN |
| 3 | DELETE MOD FROM AAL PARAMETERS FOR AAL TYPE 3/4 | — | REGISTER TRANSLATION PATTERN |
| 4 | DELETE MOD FROM AAL PARAMETERS FOR AAL TYPE 5 | — | REGISTER TRANSLATION PATTERN |
| 5 | ADD CONTENTS OF CBR RATE IN AAL PARAMETERS FOR AAL TYPE 1 | REGISTER TRANSLATION PATTERN | REGISTER TRANSLATION PATTERN |
| 6 | ADD CONTENTS OF ERROR CORRECTION METHOD FOR AAL PARAMETERS FOR AAL TYPE 1 | REGISTER TRANSLATION PATTERN | REGISTER TRANSLATION PATTERN |

FIG. 39

| | | | |
|---|---|---|---|
| 7 | DELETE CONTENTS OF HLI TYPE FOR B-HLI | REGISTER TRANSLATION PATTERN | REGISTER TRANSLATION PATTERN |
| 8 | ADD CONTENTS OF TYPE OF SUB-ADDRESS FOR CALLING PARTY SUB-ADDRESS/CALLED PARTY SUB-ADDRESS | — | — |
| 9 | CHANGE CONTENTS OF CAUSE VALUE FOR CAUSE | REGISTER TRANSLATION PATTERN | REGISTER TRANSLATION PATTERN |
| 10 | ADD CONTENTS OF CODING STANDARD FOR QOS PARAMETERS | INCLUDED IN ITEM No.12 | INCLUDED IN ITEM No.12 |
| 11 | ADD CONTENTS AND CHANGE METHOD OF USING QOS CLASS FORWARD/BACKWARD FOR QOS PARAMETERS | — | — |
| 12 | CHANGE METHOD OF USING QOS CLASS FORWARD/BACKWARD FOR QOS PARAMETERS | REGISTER TRANSLATION PATTERN | REGISTER TRANSLATION PATTERN |

FIG. 40

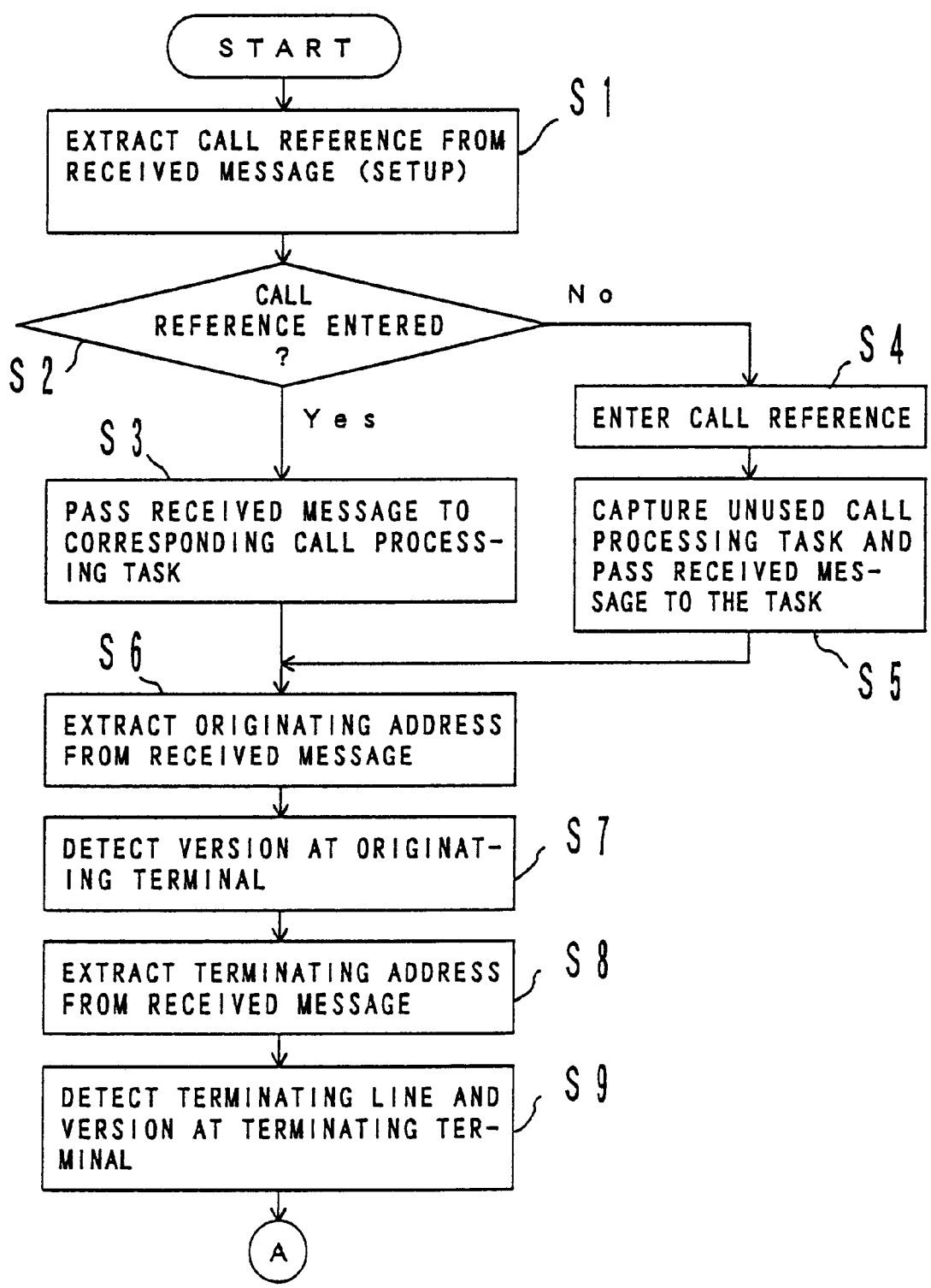
F I G. 4 1

SIGNALLING DEVICE AND SIGNALLING METHOD

BACKGROUND OF THE INVENTION

The present invention relates to a signalling device, and more specifically to a device and method for connecting terminals having different versions of signalling protocol software installed.

DESCRIPTION TO THE RELATED ART

As one of communication systems, a system is known in which a user terminal conducts negotiations with a network for network resources (bands, quality, virtual channels, etc.) before it actually begins communications and then transfers information in accordance with the results of the negotiations. Such negotiations prior to communications is called signalling. The ATM system is typical of communication systems that perform such signalling.

FIG. 1 is a schematic diagram of an example of an ATM system. In this example, eight ATM terminals A to H are connected to an ATM network which has one or more ATM switches. The protocol implemented between each ATM terminal and the ATM network is defined by UNI (User-Network Interface), while the protocol implemented between ATM switches is defined by NNI (Network-Network Interface).

Each ATM terminal has a facility (software) of setting up a call by signalling and a facility of assembling and disassembling ATM cells. Hereinafter, software that implements the former facility is referred to as signalling software.

When a call is established over an ATM network, messages (SETUP, CONNECT, etc.) are transferred between an ATM terminal and the ATM network. In the ATM terminal, the signalling software processes these messages. The ATM network determines a path and communication capabilities in accordance with those messages and notifies the ATM terminal of them. The ATM terminal then makes communications over that path.

In general, software is often subject to revisions to make its improved versions. The above signalling software is not an exception, and at present its two versions (UNI 3.0 and UNI 3.0) are widely used for SVC (Switched Virtual Channel) services in the ATM system. The two versions of the signalling software are basically compatible with each other (interconnectable), but depending on some applications, they may not be connected together.

For example, a message used to make a request for call connection, "SETUP", has a field in which AAL parameters are contained. The version UNI 3.0 is defined to set a specific value in "Mode" in the AAL parameter field, whereas the version UNI 3.1 has no "Mode" in the AAL parameter field. For LAN emulation which is an application for transferring LAN data over an ATM network, therefore, "Mode" is an essential parameter when the version UNI 3.0 is used, but it must not be present when the version UNI 3.1 is used. Suppose, for example, that a terminal B installed with the version UNI 3.0 of the signalling software and a terminal B installed with the version 3.1 attempt to communicate with each other based on LAN emulation. In this case, when a SETUP message (Mode has been contained) is transferred from the terminal B to the terminal C, the latter cannot recognize the Mode which is unnecessary for the version UNI 3.1. It may result in failure to process that message. That is, with such an application, it may become impossible to connect together terminals having the different versions of the signalling software installed.

FIG. 2 shows interconnectivity among the ATM terminals shown in FIG. 1. Some NNI signalling protocols between the ATM switches, for example IISP version 1.0, can implement both UNI 3.0 and 3.1, however it is assumed that the NNI signalling protocol in this specification conforms to the version UNI 3.1.

SUMMARY OF THE INVENTION

It is therefore an object of the present invention to provide a device and method which permits different versions of signalling software or terminals which have different versions of signalling software installed to be connected together reliably.

A signalling device of the present invention supposes an arrangement to implement signalling for establishing a connection between terminals that a network accommodates and has a storage section, a detector section, and a message translation section in addition to an existing signalling facility. The storage section stores identification information which identifies each of terminals that the network accommodates and version information representing a version of signalling software used by it with a correspondence established therebetween. The detector section, upon receipt of a signalling message, references the storage section to detect a version of the signalling software used by each of originating and terminating terminals of that signalling message. The message translation section translates the received message in accordance with the versions of the signalling software used at the originating and terminating terminals.

According to the above-described arrangement, terminals each of which uses a different version of signalling software can be connected together reliably.

Assuming that the originating and terminating terminals use first and second versions of signalling software, respectively, the message translation section deletes from the received message information elements which are contained in messages processed by the first version of the signalling software but not in messages processed by the second version. Alternatively, the message translation means adds to the received message predetermined patterns as information elements which are contained in messages processed by the second version of the signalling software but not in messages processed by the first version.

Another signalling device of the present invention supposes an arrangement that is connected to a switch installed inside a network to set up a call between terminals accommodated in the network. The storage section stores identification information that identifies each of lines that are accommodated in the switch and version information representing a version of the signalling software used by each line interface with a correspondence established therebetween. The detector section, upon receipt of a signalling message, references the storage section to detect the version of the signalling software used at the interface of each of the originating-side line and terminating-side line of the signalling message. The message translation section translates the received message in accordance with the versions of the signalling software used at the originating-side line and terminating-side line.

According to the above-described arrangement, a connection can be established reliably even if the versions of the signalling software used by the interface of the lines on which the connection is established are different to each other.

BRIEF DESCRIPTION OF THE DRAWINGS

FIG. 2 shows interconnectivity among the ATM terminals shown in FIG. 1;

FIG. 7A shows the contents of the line-based data section of FIG. 6;

FIG. 7B shows the contents of the ATM address-based data section of FIG. 6;

FIG. 8A shows the contents of the call-based data section of FIG. 6;

FIG. 8B shows the contents of the system-based data section of FIG. 6;

FIG. 10A shows the data format of a SETUP message;

FIG. 10B shows the data format of a CONNECT message;

FIGS. 11, 12, 13 and 14 show in the form of tables differences in in-message data between versions of signalling software;

FIG. 15 shows the format of the General Information Element in a version 3.1 message;

FIG. 16 shows the format of the General Information Element in a version 3.0 message;

FIG. 17 shows the format of ATM Adaptation Layer Parameters (type 1) in the version 3.1 message;

FIG. 18 shows settings of data parts in the information element of FIG. 17 which differ from counterparts in the version 3.0;

FIG. 19 shows the format of ATM Adaptation Layer Parameters (type 1) in the version 3.0 message;

FIG. 20 shows settings of data parts in the information element of FIG. 19 which differ from counterparts in the version 3.1;

FIG. 21 shows the format of ATM Adaptation Layer Parameters (type 3/4) in the version 3.1 message;

FIG. 22 shows the format of ATM Adaptation Layer Parameters (type 3/4) in the version 3.0 message;

FIG. 23 shows the format of ATM Adaptation Layer Parameters (type 5) in the version 3.1 message;

FIG. 24 shows the format of ATM Adaptation Layer Parameters (type 5) in the version 3.0 message;

FIG. 25 shows the format of Broadband High Layer Information in the version 3.1 message;

FIG. 26 shows the format of Broadband High Layer Information in the version 3.0 message;

FIG. 27 shows the format of Called Party Subaddress or Calling Party Subaddress in the version 3.1 message;

FIG. 28 shows the format of Called Party Subaddress or Calling Party Subaddress in the version 3.0 message;

FIG. 29 shows the format of Cause in the version 3.1 message;

FIG. 30 shows the format of Cause in the version 3.0 message;

FIG. 31 shows the format of Quality of Service Parameter in the version 3.1 message;

FIG. 32 shows settings of data parts in the information element of FIG. 31 which differ from counterparts in the version 3,0;

FIG. 33 shows the format of Quality of Service Parameter in the version 3.0 message;

FIG. 34 shows settings of data parts in the information element of FIG. 33 which differ from counterparts in the version 3.1;

FIGS. 35 and 36 are tables of translation processes according to a first method;

FIGS. 37 and 38 are tables of translation processes according to a second method;

FIGS. 39 and 40 are tables of translation processes according to a third method; and FIGS. 41 and 42 are flowcharts for the operation of the signalling device.

DETAILED DESCRIPTION OF THE PREFERRED EMBODIMENT

Figure 1:
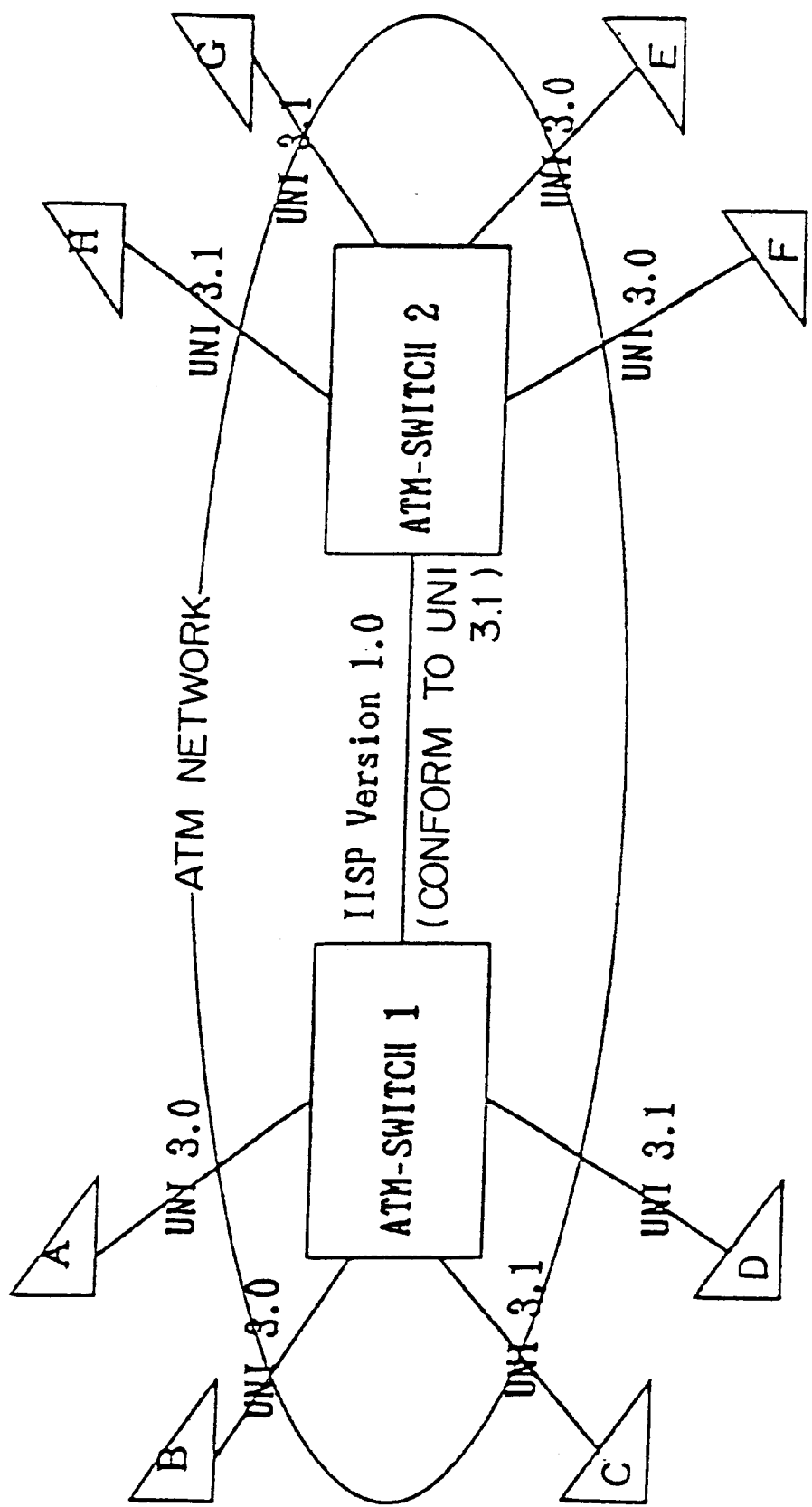
FIG. 1 is a schematic diagram of an ATM system.
Figure 3:
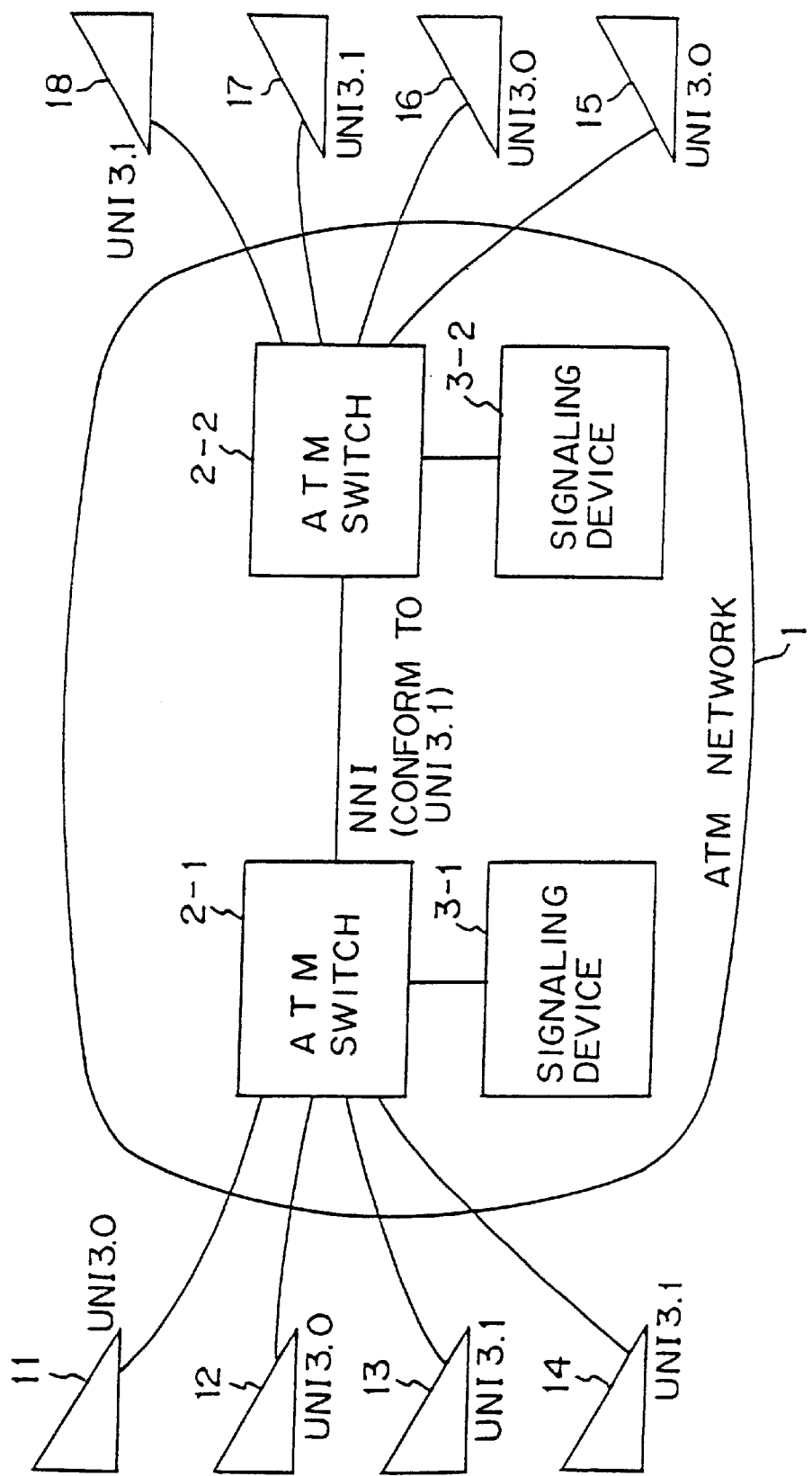
FIG. 3 is a schematic diagram of a system to which a signalling device of the present invention is applied.

FIG. 3 shows an example of a system to which a signalling device of the present invention is applied. Hereinafter, the present invention will be described as being applied to the ATM system.

An ATM network 1 has one or more ATM switches (two switches 2-1 and 2-2 in this embodiment) and transfers ATM cells in accordance with routing information (VPI/VCI) contained in their respective headers. The ATM network 1 accommodates ATM terminals (terminals 11 to 18 in this embodiment). The switches 2-1 and 2-2 have signalling devices 3-1 and 3-2, respectively. The signalling devices carry out a process of setting up a connection prior to communication in accordance with a signalling protocol.

Of the terminals that the ATM network 1 accommodates, the terminals 11, 12, 15 and 16 each have the version UNI 3.0 of signalling software installed, whereas the terminals 13, 14, 17 and 18 each have the version UNI 3.1 of signalling software installed. The NNI signalling protocol for a line that connects the switches 2-1 and 2-2 together conforms to the version UNI 3.1.

The signalling device 3, representing the signalling devices 3-1 and 3-2, has not only an existing signalling facility but also a facility of interconnecting different versions of signalling software.

Figure 4:
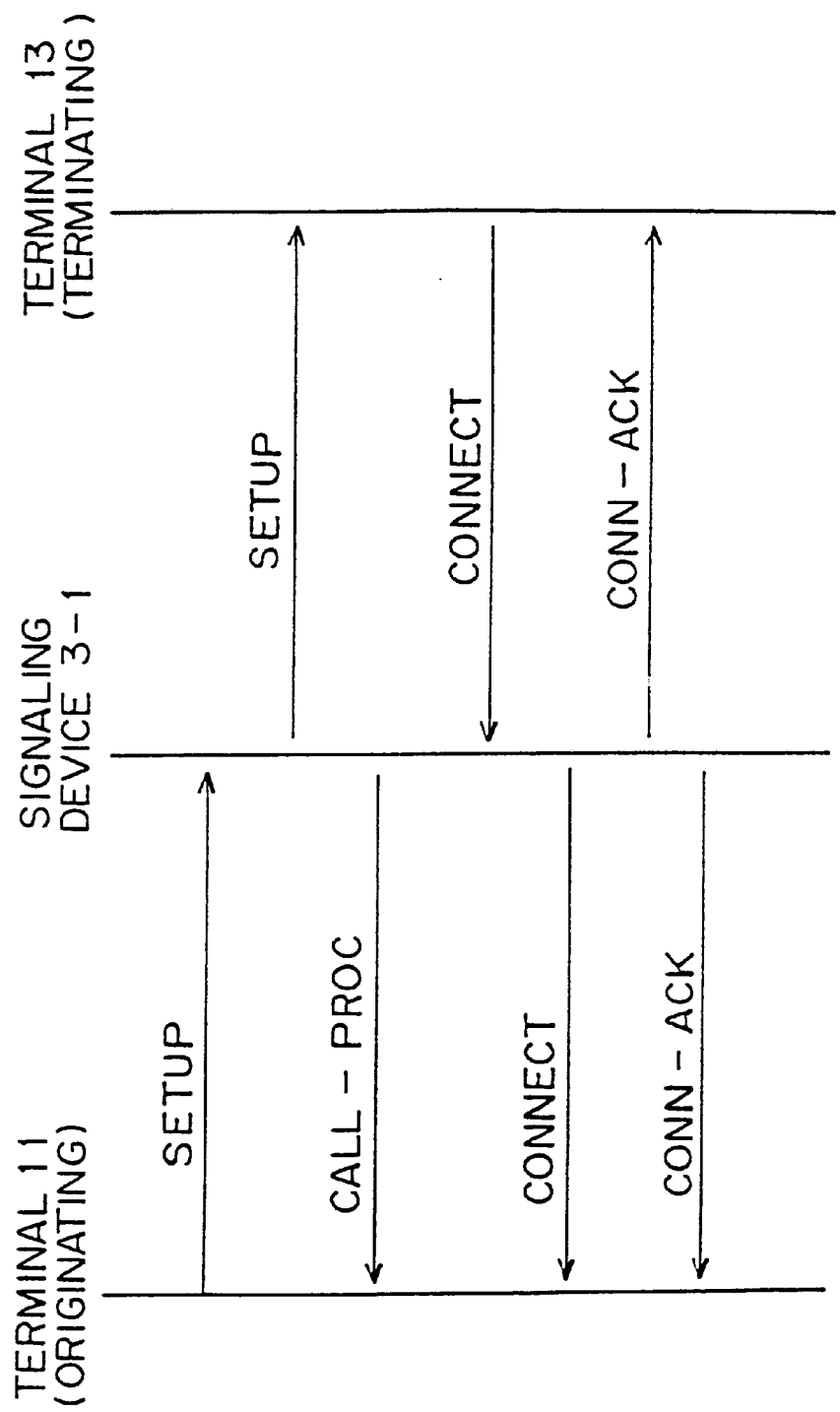
FIG. 4 shows a signalling sequence.

FIG. 4 shows a signalling sequence. Here, the terminal 11 is assumed to be the originating terminal, and the terminal 13 to be the terminating terminal.

First, the terminal 11 sends a SETUP message (call setup message) which contains the ATM address of the terminal 13 as the terminating terminal over the ATM network 1. Note that a signalling message is stored in one or more ATM cells and transferred. The switch 2-1 that accommodates the terminal 11 sends the SETUP message to the signalling device 3-1, which in turn transfers the SETUP message to the terminal 13 in accordance with the ATM address contained in the SETUP message and returns a CALL-PROC message (call accepting message) to the terminal 11.

Upon receipt of the SETUP message, the terminal 13 sends a CONNECT message that contains the ATM address of the terminal 11 as the destination terminal on to the ATM network 1. The switch 2-1 that accommodates the terminal 13 transfers that CONNECT message to the signalling device 3-1, which, in turn, transfers the CONNECT message to the terminal 11 in accordance with the ATM address contained in that message and returns a CONN-ACK message (acknowledge message) to the terminal 13.

As will be described later in detail, the SETUP message contains parameters such as quality, bandwidth, and so on of a connection to be set up. The connection is set up by the ATM network 1 granting permission for that SETUP message.

Figure 5:
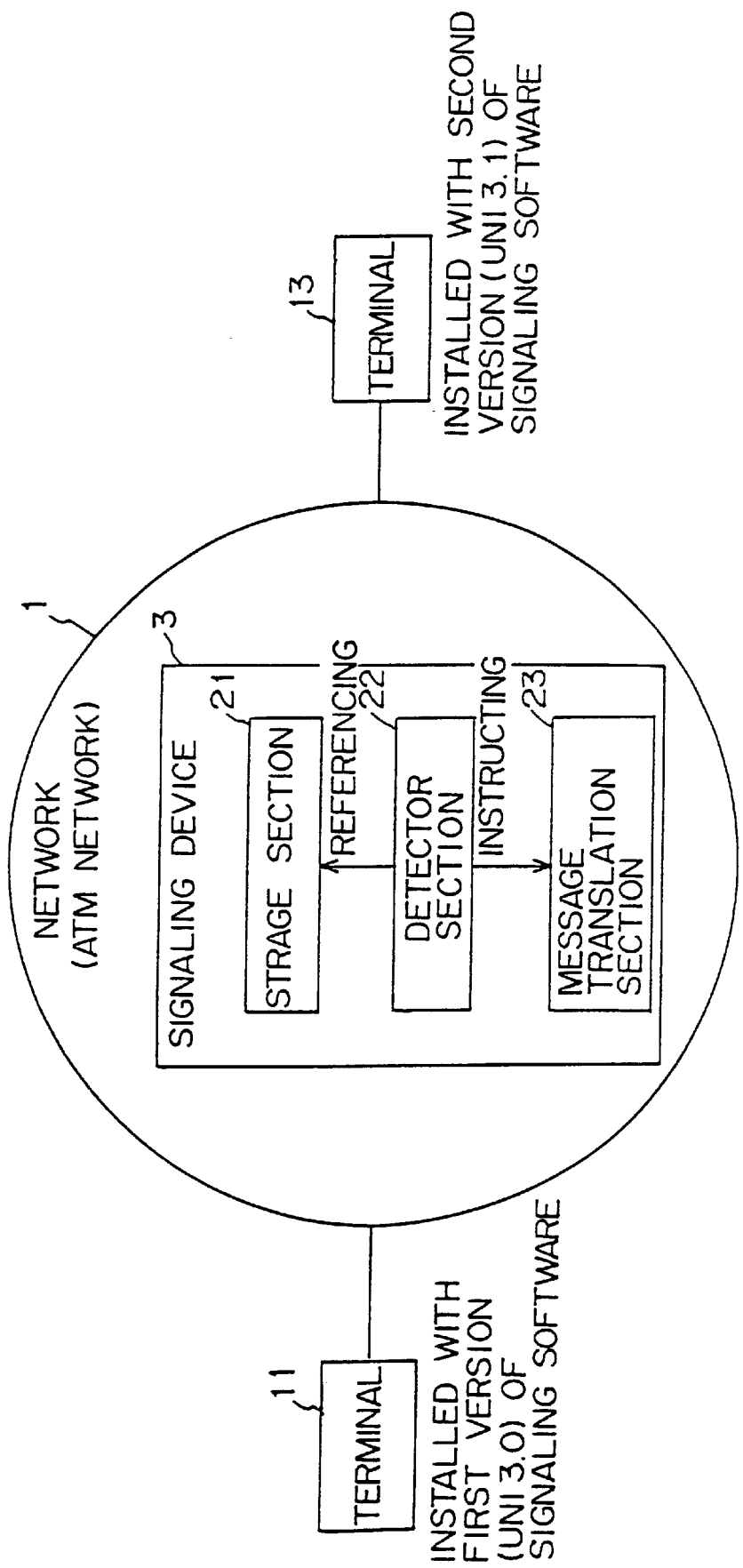
FIG. 5 is a diagram for use in explanation of the features of the signalling device of the present invention.

FIG. 5 is a diagram for use in explanation of the features of the signalling device of the present invention. The signalling device 3 has a storage section 21, a detector section 22, and a message translation section 23 as means of implementing the facility of interconnecting different version of signalling software.

The storage section 21 stores identification information for identifying each of terminals that the ATM network 1 accommodates and version information representing versions of the signalling software used by each of the terminals with a correspondence established therebetween. When receiving a signalling message, the detector section 22 references the storage section 21 to know the version of the signalling software used by each of the originating and terminating terminals of that signalling message. For example, for a call from the terminal 11 to the terminal 13, the detector section 22 will know that the originating terminal 11 has the version UNI 3.0 of the signalling software installed and the terminating terminal 13 has the version UNI 3.1 installed.

When each of the originating and terminating terminals has a different version of the signalling software installed, the message translate section 23 translates the received message into the format which the signalling software installed in the terminating terminal can process. In the example of FIG. 5, the message created by the version UNI 3.0 of the signalling software is translated into the format which the version UNI 3.1 can process. Specific examples will be described later.

Figure 6:
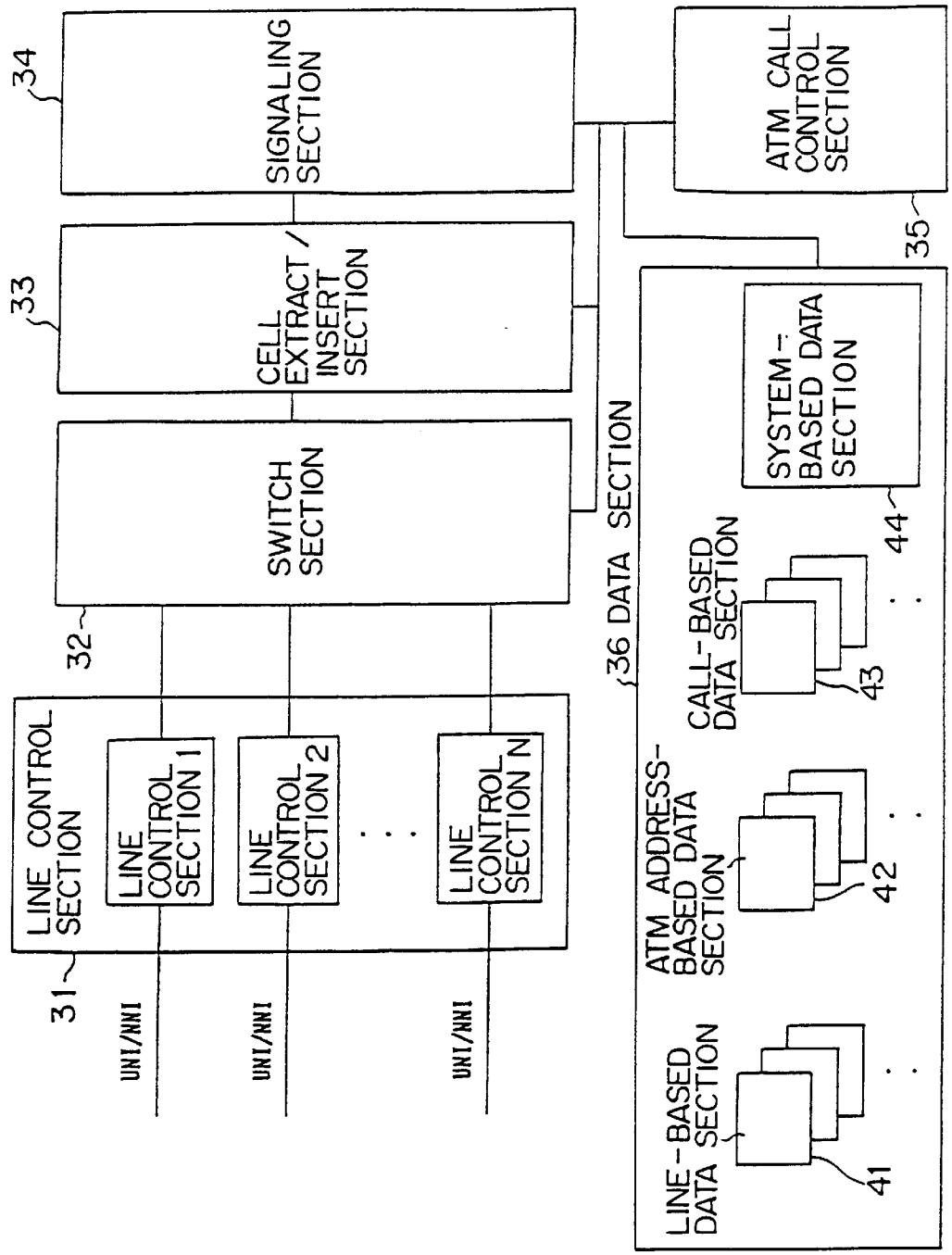
FIG. 6 shows a block diagram of a switch and a signalling device.

FIG. 6 is a block diagram of the ATM switch and the signalling device. The ATM switch including the signalling device shown in FIG. 3 may be generically termed a switch.

A line control section 31 terminates the UNI/NNI interface for each line. A switch section 32 exchanges ATM cells on a cell-by-cell basis in accordance with routing information contained in their headers. A cell extract/insert section 33 extracts signalling cells from cells entered through the line control section 31 and passes them to a signalling section 34, and sends signalling cells output from the signalling section 34 to the switch section 32. The signalling section 34 terminates the ATM signalling protocol layer 2/layer 3 and passes a received message to an ATM call control section 35 for message processing. The ATM call control section 35 performs control associated with originating, terminating, connecting, and disconnecting an SVC (Switched Virtual Channel) call and routing processing. A data section 36 manages system-based data, call-based data, ATM address-based data, and line-based data. Data stored in the data section 36 are registered, deleted, changed and referenced by the signalling section 34 or the ATM call control section 35.

The data section 36 will be described with reference to FIGS. 7A and 7B and FIGS. 8A and 8B. The data section is assumed here to be contained in the signalling device 3-1 shown in FIG. 3. In these figures, there are illustrated only data directly related to the present invention.

FIG. 7A shows the line-based data section 41, which stores attribute data on a line basis. The line-based data section 41 in the signalling device 3-1 contains, for each of lines which the switch 2-1 accommodates, the ATM address of the terminal connected to it, the version of signalling software used by that terminal, and a translation pattern. Information representing the version of signalling software used by each terminal is registered when the user at the terminal subscribes to the ATM network.

With the line-based data section 41 shown in FIG. 7A, it is assumed that only one ATM terminal is connected to each UNI line. In the line-based data section 41 are stored data associated with the NNI line ( the line between the switches 2-1 and 2-2) as well. The translation patterns are data used to translate a message created using the version UNI 3.0 of the signalling software into the format the version UNI 3.1 can process and vice versa and describe processing in the message translate section 23 shown in FIG. 5. Thus, translation patterns that vary from line to line can be set up.

FIG. 7B shows an ATM address-based section 42, which holds attribute data on an ATM address basis. One or more ATM terminals can be connected to each UNI line. FIG. 7B shows a case in which two ATM terminals are connected to the line #1. In the ATM address-based data section 42, a translation pattern is set up for each ATM address. That is, translation patterns that vary from ATM address to ATM address can be set up.

FIG. 8A shows a call-based data section 43, which holds attribute data on a call basis. The call-based data section 43 holds call-originating ATM address and a call-terminating ATM address for each call reference. The call reference is information that identifies a call and is allocated to that call on the location from which it is originated. For example, when the terminal 11 sends a message (normally a SETUP message) to establish a connection with the terminal 12, a call reference is appended to that message before it is sent over the network. Upon receipt of the message, the signalling device 3-1 extracts the call reference from the received message and then examines whether or not that call reference has been entered into the call-based data section 43. If not, a new call is considered to have been created, so that the extracted call reference is entered into the call-based data section 43. The originating ATM address (the ATM address of the terminal 11) and the terminating ATM address (the ATM address of the terminal 12) contained in the received message are entered into the call-based data section 43 in such a manner that they are associated with the newly entered call reference.

FIG. 8B shows a system-based data section 44, which holds system-specific attribute data. Data that are directly related to the present invention include data that specify a translation unit and translation pattern data. The translation is made either by system, by line, or by ATM address. In this embodiment, a unit of a "system" represents one switch system as shown in FIG. 6.

Figure 9:
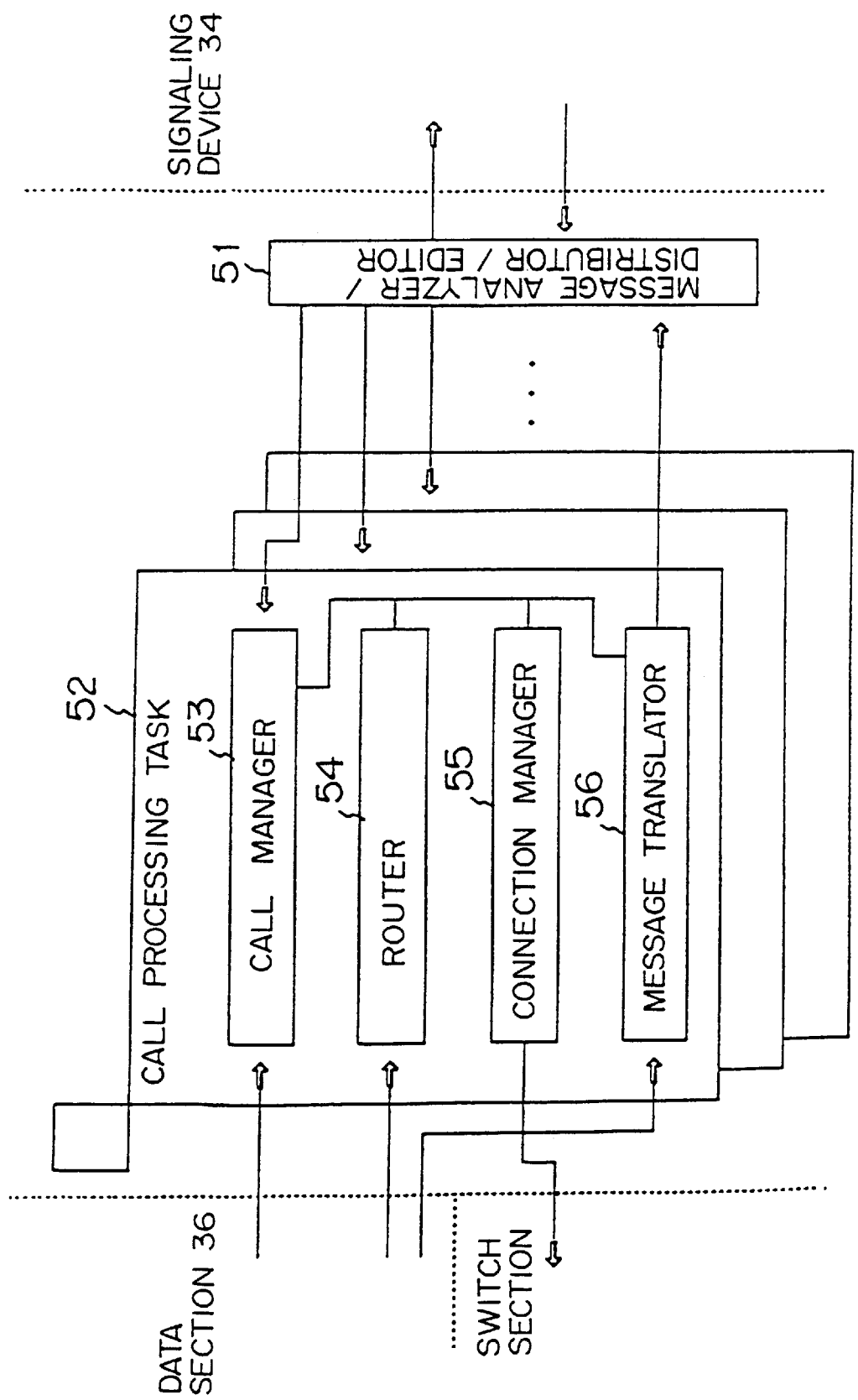
FIG. 9 is a block diagram of the ATM call controller of FIG. 6.

FIG. 9 is a block diagram of the ATM call control section 35. A message analyzer/distributor/editor 51 analyzes a message received from the signalling section 34, makes a request to a call processing task 52 for message processing, and passes a message output from that call processing task 52 to the signalling section 34. The call processing task 52, which is created for each call, performs SVC call processing (connection and disconnection of a call, management of the call state, etc.). A call manager 53 manages the state of a call. A router 54 performs such a routing process as analyzes the address or subaddress of the terminating terminal that is contained in a message to determine VPI/VCI. A connection manager 55 manages the status of a SVC connection and controls the switch section 32. A message translator 56 references the data section 36 and translates a received message according to the contents of the data section 36 when the message sending and receiving terminals each have a different version of signalling software installed.

FIGS. 10A and 10B show the data formats of SETUP and CONNECT messages, respectively. Although various messages are used for signalling, two messages are explained herein which are closely related with the present invention.

In FIGS. 10A and 10B, data in the Information element field for which "both" is listed in the Direction field are contained in a message when it is sent from an ATM terminal to the ATM network 1 and from the ATM network to an ATM terminal. Data in the Information field for which "N→U" is listed in the Direction field is contained in a message only when it is sent from the ATM network 1 to an ATM terminal. In contrast, data in the Information field for which "U→N" is listed in the Direction field is contained in a message only when it is sent from an ATM terminal to the ATM network 1.

Data in the Type field indicates whether the corresponding data in the Information field is mandatory or an option for a message. In FIGS. 10A and 10B, "M" stands for mandatory, whereas "O" stands for an option. Each value in the Length field indicates the octet length of the corresponding data in the Information element field.

The formats of the messages used for signalling, including the SETUP and CONNECT messages shown in FIGS. 10A and 10B, remain basically unchanged even if different signalling software versions are used. However, their details vary depending on which of the versions UNI 3.0 and UNI 3.1 is used. The differences between information elements (or their subfields) in messages depending on different signalling software versions are summed up in FIGS. 11 to 14.

In FIGS. 11 to 14, "General Information Element" in item No. 1, which is not shown in the formats of FIGS. 10A and 10B, is common data added to each variable-length information element (each information element in items Nos. 5 to 19). "Cause" in item No. 9, though not contained in the SETUP and CONNECT messages, is contained in other signalling messages (for example, a RELEASE message, a STATUS message, etc.). Information elements in other items are contained as information elements 5, 8, 12, 14 and 16 of FIGS. 10A and 10B in the SETUP or CONNECT message. The differences between the versions shown in FIGS. 11 to 14 are shown in more detail in FIGS. 15 to 34.

The signalling device 3 absorbs the differences among information elements in messages due to the different signalling software versions. That is, the signalling device 3 properly translates messages so as to absorb the difference between the version UNI 3.1 and the version UNI 3.0 of the signalling software.

As message translation methods, this embodiment provides translation to delete specific information elements (a first translation method), translation to replace specific information elements with a fixed pattern (a second translation method), and translation to replace specific information elements with a registered pattern (a third translation method).

FIGS. 35 and 36 form a table of translation processes according to the first translation method. The first method absorbs the difference between the different versions of the signalling software by deleting unnecessary information elements for the signalling software at the terminating terminal from a received message.

In FIGS. 35 and 36, the "Version 3.0→Version 3.1" field contains message processing performed to translate a message processed by the version UNI 3.0 of the signalling software into a message to be processed by the version UNI 3.1. Assuming, for example, that the terminal 11 of FIG. 3 sends a message to the terminal 13, this processing is performed by the signalling device 3-1. Assuming that the interface of the NNI line connecting the switch 2-1 and the switch 2-2 uses the version UNI 3.1 and the terminal 11 sends a message to an ATM terminal (one of the terminals 15 to 18) that the switch 2-2 accommodates, the processing is carried out by the signalling device 3-1. "AAL Parameters for Type 3/4" in item No. 3 will be explained specifically. For version 3.0 -based messages, AAL Parameters for Type 3/4 define a "Mode" setting of eight bits as shown in FIG. 22. For the version 3.1, however, the AAL Parameters for Type 3/4 does not define the "Mode" as shown in FIG. 21. When receiving a message created by the version 3.0 as it is, therefore, the version 3.1 of the signalling software cannot interpret the "Mode" in that message. Under certain conditions, the whole signalling sequence will stop. For this reason, the first translation method deletes information elements (Mode and Mode Identifier in this case) that are contained in messages processed by the version 3.0, but are not contained in messages processed by the version 3.1.

In FIGS. 35 and 36, on the other hand, the "Version 3.1→Version 3.0" field contains a process of translating messages processed by the version UNI 3.1 into messages adapted for the version UNI 3.0. For example, this process is performed by the signalling device 3-1 when the terminal 13 of FIG. 3 sends a message to the terminal 11. Assuming that the interface of the NNI line connecting the switch 2-1 and the switch 2-2 uses the version UNI 3.1, the signalling device 3-1 carries out this process when receiving a message bound for the terminal 11 over the NNI line. The technique of deleting information elements remains unchanged from the Version 3.0→Version 3.1 processing.

When, in FIGS. 35 and 36, one or more translation methods are defined for one item number, any one of these may be carried out.

FIGS. 37 and 38 form a table of translation processes according to the second translation method. The second translation method absorbs the differences between the signalling software versions by adding an information element required by the signalling software used at terminating terminals or rewriting the information element suitably in accordance with predetermined data.

A specific example of the second translation method will be explained in reference to the Version 3.1→Version 3.0 processing for the AAL Parameters for Type 3/4. As described previously in conjunction with FIGS. 21 and 22, no "Mode" is contained in the AAL Parameters for Type 3/4 for version 3.1 messages, while the "Mode" is contained in the AAL Parameters for Type 3/4 for version 3.0 messages. When receiving a message created using the version 3.1 as it is, therefore, the version 3.0 of the signalling software cannot derive the "Mode" from that message. Under certain conditions, the whole signalling sequence will stop. For this reason, to pass a message created on the basis of the version 3.1 to the version 3.0 for processing, the second method reserves a "Mode" area in that message and then sets a value of "00000001" in that area which represents a mode.

FIGS. 39 and 40 form a table of translation processes according to the third translation method. The third translation method remains basically unchanged from the second translation method except that the translation patterns are not fixed and the user or network administrator is allowed to enter a desired pattern. This entry is made through a maintenance console by way of example.

An example of a difference between the second and third translation methods will be described in reference to the Version 3.1→Version 3.0 processing for CBR rate in the AAL Parameters for Type 1. According to the second translation method, to pass a message from the version 3.1 to the version 3.0, a value determined on a fixed basis on the system side is set as the CBR (64 Kbps in the example of FIG. 37). However, another value can be set as the CBR. The third method allows a desired value to be entered in advance as the CBR. For example, pre-entry of "00000100" as the translation pattern in this case will result in 1544 Kbps being set as the CBR.

Thus, the third translation method can set up a call flexibly while absorbing the differences resulting from the different versions of the signalling software.

As described above, the message translation processing of the embodiment is basically implemented according to a version of the signalling software used by each terminal, but, when the signalling device sends a message to the NNI line or receives a message from the NNI line, it is implemented according to the facility (version) of signalling software used by the NNI line interface. This is common to the first, second and third methods.

The message translation procedures according to the first, second and third methods are stored in the data section 36 of FIG. 6, and the ATM call control section 35 performs the translation in accordance with the procedures stored in that data section 36. Here, the translation pattern may be common to the whole system, or may be set by line or ATM address. When a common pattern is used in the whole system, the system flag in the system-based data section 44 shown in FIG. 8B is set to one, and the translation patterns shown in FIGS. 35 to 40 are entered into the system-based data section 44. When the translation patterns are set line by line, the line flag in the system-based data section 44 is set to one, and the translation patterns shown in FIGS. 35 to 40 are entered into the line-based data section 41 so that they are made to correspond with the lines. Also, when the translation patterns are set ATM address by ATM address, the ATM address flag in the system-based data section 44 is set to one, and the translation patterns shown in FIGS. 35 to 40 are entered into the ATM address-based data section 42 so that they are made to correspond with the ATM addresses.

So far the first, second and third translation methods have been described as being independent of one another. Alternatively, they may be used in combination. For example, for the Version 3.1→Version 3.0 processing, the first translation method may be used for item No. 8 to delete information elements, the second translation method may be used for item Nos. 2 to 6, 9, and 10 to add or replace information elements, and the third translation method may be used for item Nos. 1, 7, 11, and 12 to add or replace information elements. For the combined use of the first, second and third translation methods, it is required only that a translation pattern be determined for each item and then entered into the data section 36.

Figure 42:
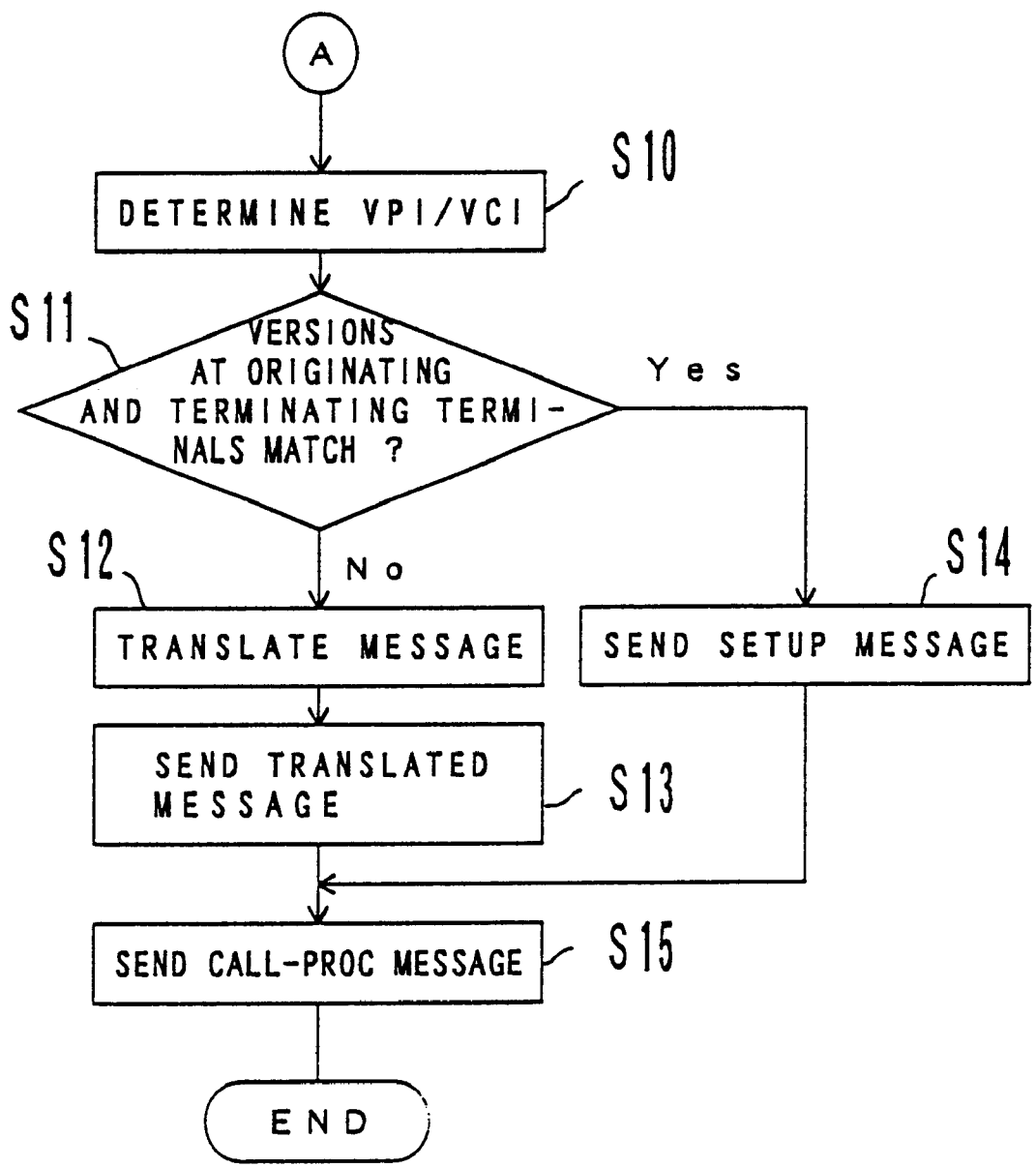

FIGS. 41 and 42 are flowcharts for the operation of the signalling device 3. The operation of the signalling device to receive a SETUP message will be described herein.

In step S1, a call reference is extracted from a received SETUP message. In step S2, an examination is made as to whether or not that call reference has been already entered into the call-based data section 43. If the call reference has been entered, in step S3 the received SETUP message is passed to the call processing task corresponding to the call reference for processing. If, on the other hand, the call reference has not been entered, then it is newly entered into the call-based data section 43 in step S4. In step S5, an unused call processing task is captured and the received SETUP message is then passed to the captured call processing task for processing. The processes in steps S1 to S5 are carried out by the message analyzer/distributor/editor 51.

The call manager 53 associated with the call processing task 52 that has received the SETUP message extracts the originating address (the ATM address of the originating terminal) from that SETUP message in step S6. In step S7, the line-based data section 41 is accessed using the originating address as a key to detect the version information of the signalling software used by the terminal having that originating address.

In step S8, the call manager 53 extracts the terminating address (the ATM address of the terminating terminal) from the SETUP message and then passes it on to the router 54 for routing the message. In step S9, the router 54 makes access to the line-based data section 41 using the terminating address as a key to detect the version information of the signalling software used by the terminating terminal. At this time, the router 54 retrieves from the line-based data section 41 information to identify the line (the terminating line) corresponding to the terminating address as well. The router 54 then passes the version information and the terminating line identification information to the call manager 53.

When the message is received over an NNI line, the version information of the signalling software used by the interface of that NNI line is retrieved from the line-based data section 41 instead of the version information corresponding to the originating address. When the terminal that has the terminating address contained in that message is accommodated in the other switch, the version information of the signalling software used by the interface of a line (NNI line) for transferring cells to that switch is retrieved from the line-based data section 41.

In step S10, the connection manager 55 determines VPI/VCI using information to identify the originating line (the line over which the message has been transferred) and information to identify the terminating line detected in step S9 as parameters. The originating line is notified from the switch to the signalling device.

In step S11, a decision is made as to whether or not the version information on the originating side detected in step S7 matches the version information on the terminating side detected in step S9. The result of the decision as well as the received message is passed to the message translator 56. If the decision is that the two versions match, then the procedure goes to step S14; otherwise, the procedure goes to step S12.

In step S12, the SETUP message is translated into a format that can be processed by the signalling software used by the terminating terminal or line. First, the system-based data section 44 is referenced to examine which of the system flag, the line flag, and the ATM address flag has been set. When the system flag has been set, specific information elements or their subfields in the SETUP message are translated (deleted, replaced, or added) in accordance with the translation pattern data stored in the system-based data section 44. When the line flag has been set, the line-based data section 41 is referenced to translate specific information elements or their subfields in the SETUP message in accordance with translation pattern data corresponding to the originating line or the terminating line. When the ATM address flag has been set, the ATM address-based data section 42 is referenced to translate specific information elements or their subfields in the SETUP message in accordance with translation pattern data for the originating address or terminating address. At this point, the processing of Version 3.1→Version 3.0 or Version 3.0→Version 3.1 is carried out based on the version information on the originating and terminating sides. The translation processing is carried out by the message translator 56.

Which of the first, second and third methods is used in the above translation processing depends on translation patterns stored in the data section 36. That is, assuming, for example, that the translation patterns shown in FIGS. 35 and 36 are stored in the data section 36, the first translation method will be implemented. If translation patterns that combine the first, second and third translation methods are stored, then the first, second or third translation method will be implemented properly for each information element.

In step S13, the SETUP message having its information elements translated in step S12 is passed to the signalling device 34, which, in turn, sends that SETUP message over the terminating line detected in step S9. In step S14, on the other hand, the received SETUP message is sent over the terminating line detected in step S9 without being translated by the message translator 56. In step S15, a CALL-PROC message is sent to the originating terminal.

In the normal signalling sequence, a CONNECT message is processed after the SETUP message as shown in FIG. 4. In this case, the signalling software versions on the originating and terminating sides are detected in step S1 to S11 and prescribed information elements in the CONNECT message or their subfields are translated as required.

The present invention permits terminals using different versions of signalling software to be connected together reliably. In the ATM SVC services in particular, communication between the UNI Version 3.0 and the UNI Version 3.1 for which interconnectivity is not always assured can be reserved for a wider range of applications. Considering that at present there are a large number of ATM terminals each of which accommodates either the UNI Version 3.0 and the UNI Version 3.1, it is very useful to improve the connectivity between these terminals. Moreover, the present invention allows LAN emulation which, of ATM system-based applications, is the most widely used one to be run reliably.

What is claimed is:

1. A device for performing signalling to set up a connection between an originating terminal and a terminating terminal connected to a network using a common signaling message having a plurality of versions of signaling specification, comprising:

storage means for storing identification information for identifying the terminals and version information for representing versions of signalling specification that are used at each of the terminals with a correspondence established therebetween;

an input port receiving the signalling message from said originating terminal via the network;

detecting means for referencing said storage means and detecting versions of the signalling specification that are used at each of said originating and terminating terminals of the received signalling message;

message translation means for translating a specified element of the received signalling message on the basis of the versions of the signalling specification that are used at said originating and terminating terminals; and an output port outputting the translated signalling message to said terminating terminal via the network.

2. A device for performing signaling to set up a connection between an originating terminal and a terminating terminal connected to a network using a common signaling message having a plurality of versions of signaling specification, comprising:

storage means for storing identification information for identifying the terminals and version information for representing versions of signaling specification that are used at each of the terminals with a correspondence established therebetween:

translation pattern holding means for holding translation patterns for information elements each of which is represented by data that differ from each other in first and second versions of the signaling software;

detecting means for, upon receipt of a signaling message, referencing said storage means and detecting versions of the signaling specification that are used at said originating and terminating terminals of the signaling message; and message translation means for, when first and second versions of the signalling software are respectively used at the originating and terminating terminals, translating a specified element of the received signaling message on the basis of the versions of the signaling specification that are used at said originating and terminating terminals, deleting from the received message information elements that are contained in messages processed by the first version of the signaling specification but not in messages processed by the second version of the signaling specification, and rewriting the received message in accordance with a translation pattern held in said translation pattern holding means.

3. A device for performing signalling to set up a connection between an originating terminal and a terminating terminal connected to a network using a common signaling message having a plurality of versions of signaling specification, comprising:

storage means for storing identification information for identifying the terminals and version information for representing versions of signalling specifications that are used at the terminals with a correspondence established therebetween;

an input port receiving the signalling message from said originating terminal via the network;

detecting means for referencing said storage means and detecting versions of the signalling specification that are used at each of said originating and terminating terminals of the received signalling message; and message translation means for, when first and second versions of the signalling software are respectively used at said originating and terminating terminals, translating a specified element of the received signalling message on the basis of the versions of the signalling specification that are used at said originating and terminating terminals, and adding to the received message a predetermined pattern as an information element that is contained in messages processed by the second version of the signalling software but not in messages processed by the first version of the signalling software, and an output-port outputting the translated signalling message to said terminating terminal via the network.

4. A device for performing signalling to set up a connection between an originating terminal and a terminating terminal connected to a network using a common signaling message having a plurality of versions of signaling specification, comprising storage means for storing identification information for identifying the terminals and version information for representing versions of signalling specification that are used at each of the terminals respectively with a correspondence established therebetween;

an input port receiving a signalling message from an originating terminal via the network;

detecting means for referencing said storage means and detecting versions of the signalling specification that are used at said originating terminal and said terminating terminal of the received signalling message;

translation pattern holding means for holding translation patterns for information elements each of which is represented by data that differ from each other in first and second versions of the signalling software;

message translation means for, when the first and second versions of the signalling software are respectively used at said originating and terminating terminals, translating a specified element of the received signalling message on the basis of the versions of the signalling specification that are used at said originating and terminating terminals, and rewriting the received message in accordance with a translation pattern held in said translation pattern holding means; and an output port outputting the translated message to said terminating terminal via the network.

5. The device according to claim 4, wherein the translation patterns are set up for each system.

6. The device according to claim 4, wherein the translation patterns are set up for each line.

7. The device according to claim 4, wherein the translation patterns are set up for each terminal.

8. The device according to claim 4, further comprising means for allowing a user to rewrite the translation patterns.

9. A device for performing signalling to set up a connection between an originating terminal and a terminating terminal connected to a network using a common signaling message having a plurality of versions of signaling specification, comprising:

storage means for storing identification information for identifying lines connected to the switch and version information for representing versions of signalling specification used at interfaces of the lines with a correspondence established therebetween;

an input port receiving the signalling message from an interface of an originating line via the network;

detecting means for referencing said storage means and detecting versions of the signalling specification that are used at interfaces of said originating line and a terminating line of the received signalling message;

message translation means for translating a specified element of the received signalling message on the basis of the versions of the signalling specification that are used at the interfaces of said originating and terminating lines; and an output port outputting the translated signalling message to an interface of said terminating line via the network.

10. A device, connected to a switch installed inside a network, for performing signalling to set up a connection between an originating terminal and a terminating terminal connected to the network, comprising:

storage means for storing identification information for identifying lines connected to the switch and version information for representing versions of signalling software used at interfaces of the lines with a correspondence established therebetween;

an input port receiving the signalling message from an interface of an originating line via the network;

detecting means for referencing said storage means and detecting versions of the signalling specification that are used at interfaces of said originating line and a terminating line of the received signalling message; and message translation means for, when first and second versions of the signalling specification are respectively used at the interfaces of said originating and terminating lines, translating a specified element of the received signalling message on the basis of the versions of the signalling specification that are used at said originating and terminating terminals, and deleting from the received message information elements that are contained in messages processed by the first version of the signalling specification but not in messages processed by the second version of the signalling; and an output port outputting the translated message to an interface of said terminating terminal via the network.

11. A device, connected to a switch installed inside a network, for performing signalling to set up a connection between terminals comprising:

storage means for storing identification information for identifying lines connected to the switch and version information for representing versions of signalling specification that are used at interfaces of the lines with a correspondence established therebetween;

an input port receiving the signalling message from an interface of an originating line via the network;

detecting means for referencing said storage means and detecting versions of the signalling specification that are used at the interfaces of said originating line and a terminating line of the received signalling message;

message translation means for, when first and second versions of the signalling software are respectively used at the interfaces of the originating and terminating lines, translating a specified element of the received signalling message on the basis of the versions of the signalling specification that are used at said originating and terminating terminals, and adding to the received message predetermined patterns as information elements that are contained in messages processed by the second version of the signalling software but not in messages processed by the first version of the signalling software; and an output port outputting the translated message to an interface of said terminating line via the network.

12. A device for performing signalling to set up a connection between an originating terminal and a terminating terminal connected to a network using a common signaling message having a plurality of versions of signaling specification, comprising:

storage means for storing identification information for identifying lines connected to the switch and version information for representing versions of signalling specification used at interfaces of the lines with a correspondence established therebetween;

an input port receiving the signalling message from an interface of an originating line via the network;

detecting means for referencing said storage means and detecting versions of the signalling specification that are used at each of the interfaces of said originating line and a terminating line of the signalling message;

translation pattern holding means for holding translation patterns for information elements each of which is represented by data that differ from each other in first and second versions of the signalling software;

message translation means for, when the first and second versions of the signalling software are respectively used at the interfaces of said originating and terminating lines, translating a specified element of the received signalling message on the basis of the versions of the signalling specification that are used at said originating and terminating terminals, and rewriting the received message in accordance with a translation pattern held in said translation pattern holding means; and an output port outputting the translated message to an interface of said terminating line via the network.

13. The device according to claim 12, wherein the translation patterns are set up for each system.

14. The device according to claim 12, wherein the translation patterns are set up for each line.

15. The device according to claim 12, wherein the translation patterns are set up for each terminal.

16. The device according to claim 12, further comprising means for allowing a user to rewrite the translation patterns.

17. A signalling method for setting up a connection between originating and terminating terminals connected to a network, comprising the steps of:

storing identification information for identifying terminals connected to a network and version information for representing versions of signalling specification that are used at the terminals with a correspondence established therebetween;

receiving a signalling message from an originating terminal via the network;

referencing the stored information to detect versions of the signalling specification that are used at said originating terminal and terminating terminal of the signalling message;

translating a specified element of the received signalling message on the basis of the versions of the signaling specification used at the interfaces of said originating and terminating terminals; and outputting the translated message to said terminating terminal via the network.

18. A method, performed in a switch installed in a network, for signalling to set up a connection between originating and terminating terminals connected to the network; comprising the steps of:

storing identification information for identifying originating and terminating lines connected to the switch and version information for representing versions of signalling specification that are used at interfaces of the lines with a correspondence established therebetween;

receiving a signalling message from an interface of an originating line via the network;

referencing the stored information to detect versions of the signalling specification that are used at the interfaces of said originating line and a terminating line of the received signalling message;

translating the received message on the basis of the versions of the signalling specification used at said originating and terminating lines; and outputting the translated message to an interface of said terminating line via the network.

* * * * *